(12) United States Patent
Paluch et al.

(10) Patent No.: US 11,775,901 B2
(45) Date of Patent: Oct. 3, 2023

(54) REAL TIME TESTING AND MONITORING FOR BUSINESS PROCESS MANAGEMENT SYSTEMS

(71) Applicant: International Business Machines Corporation, Armonk, NY (US)

(72) Inventors: Michal Paluch, Cracow (PL); Karol Cisowski, Cracow (PL); Tomasz Ploskon, Cracow (PL); Jaroslaw Musial, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 16/833,703

(22) Filed: Mar. 30, 2020

(65) Prior Publication Data
US 2021/0304091 A1    Sep. 30, 2021

(51) Int. Cl.
| | |
|---|---|
| *G06Q 10/0633* | (2023.01) |
| *G06N 5/04* | (2023.01) |
| *G06F 16/28* | (2019.01) |
| *G06N 20/00* | (2019.01) |

(52) U.S. Cl.
CPC ....... *G06Q 10/0633* (2013.01); *G06F 16/283* (2019.01); *G06N 5/04* (2013.01); *G06N 20/00* (2019.01)

(58) Field of Classification Search
CPC .... G06Q 10/0633; G06F 16/283; G06N 5/04; G06N 20/00; G06N 3/08
See application file for complete search history.

(56) References Cited

U.S. PATENT DOCUMENTS

| | | | | |
|---|---|---|---|---|
| 10,147,066 | B2* | 12/2018 | Viswanathan | G06Q 10/067 |
| 11,657,921 | B2* | 5/2023 | Zimmerman | G16H 50/20 |
| | | | | 600/301 |
| 2006/0020641 | A1* | 1/2006 | Walsh | G06Q 10/10 |
| | | | | 707/999.203 |
| 2010/0082378 | A1* | 4/2010 | Isaacs | G06Q 10/06393 |
| | | | | 705/7.11 |
| 2017/0109657 | A1* | 4/2017 | Marcu | G06N 5/047 |
| 2019/0295011 | A1* | 9/2019 | Shi | G06F 3/0483 |
| 2019/0347590 | A1* | 11/2019 | Rajasekaran | G06Q 10/0635 |

FOREIGN PATENT DOCUMENTS

CN          106897204 A          6/2017

OTHER PUBLICATIONS

Kuhner et al., "Machine Learning for Predictive Business Process Monitoring", Seminar Thesis, Faculty of Business and Economics of the University of Augsburg, Submission date of the thesis: Jun. 3, 2016, 45 pages, <https://www.academia.edu/32763434/Machine_Learning_for_Predictive_Business_Process_Monitoring>.

(Continued)

*Primary Examiner* — Dylan C White
(74) *Attorney, Agent, or Firm* — Michael A. Petrocelli (57) ABSTRACT

Providing a method for real-time testing and monitoring of a business process management system in order to identify commonly failing parameters. Machine learning methods are used to run multiple rounds of testing of the business process management system to more accurately identify commonly failing parameters and to modify the business process by removing those identified parameters from future rounds of testing.

18 Claims, 3 Drawing Sheets

(56) References Cited

OTHER PUBLICATIONS

Mehdiyev et al., "A Multi-Stage Deep Learning Approach for Business Process Event Prediction", 2017 IEEE 19th Conference on Business Informatics, © 2019 IEEE, 10 pages, <https://ieeexplore.ieee.org/document/8010713>.

Wikipedia, "Business process management", this page was last edited on Mar. 16, 2020, 7 pages, <https://en.wikipedia.org/wiki/Business_process_management>.

* cited by examiner

REAL TIME TESTING AND MONITORING FOR BUSINESS PROCESS MANAGEMENT SYSTEMS

BACKGROUND

The present invention relates generally to the field of business process management, and more particularly to using machine-learning processes with business process management.

The Wikipedia entry for "Business Process Management" (as of Mar. 4, 2020) states as follows: "Business process management (BPM) is a discipline in operations management in which people use various methods to discover, model, analyze, measure, improve, optimize, and automate business processes. Any combination of methods used to manage a company's business processes is BPM. Processes can be structured and repeatable or unstructured and variable. Though not required, enabling technologies are often used with BPM. [BPM] can be differentiated from program management in that program management is concerned with managing a group of inter-dependent projects. From another viewpoint, [business] process management includes program management. In project management, [business] process management is the use of a repeatable process to improve the outcome of the project. Key distinctions between process management and project management are repeatability and predictability. If the structure and sequence of work is unique, then it is a project. In business process management, a sequence of work can vary from instance to instance: there are gateways, conditions; business rules etc. The key is predictability . . . the conditions for the process to take one route or another [is understood]."

SUMMARY

According to an aspect of the present invention, there is a method, computer program product and/or system that performs the following operations (not necessarily in the following order): (i) running, by a first user, a plurality of runs of a first set of business processes, with each run of the first plurality of runs including collecting a set of internal runtime parameters and external parameters; (ii) detecting, by a business process solution module, a first business process management (BPM) failure, with the detection of the first BPM failure including detecting all internal runtime and external parameters involved in the run associated with the first BPM failure; (iii) storing, in a reference data warehouse, the internal runtime and external parameters involved in the run associated with the first BPM failure; (iv) building, by a BPM machine-learning module, a first high risk test scenario, with the building of the first high risk test scenario using a pre-selected set of failing parameters stored in the reference data warehouse; (v) running, by the BPM machine-learning module, a plurality of runs of the first high risk test scenario; and (vi) responsive to the running of the plurality of runs, modifying, by the BPM machine-learning module, the first high risk test scenario by: (a) identifying a sub-set of problematic parameters, and (b) removing the sub-set of problematic parameters.

DETAILED DESCRIPTION

Some embodiments of the present invention are directed to a method for real-time testing and monitoring of a business process management system in order to identify commonly failing parameters. Machine learning methods are used to run multiple rounds of testing of the business process management system to more accurately identify commonly failing parameters and to modify the business process by removing those identified parameters from future rounds of testing.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
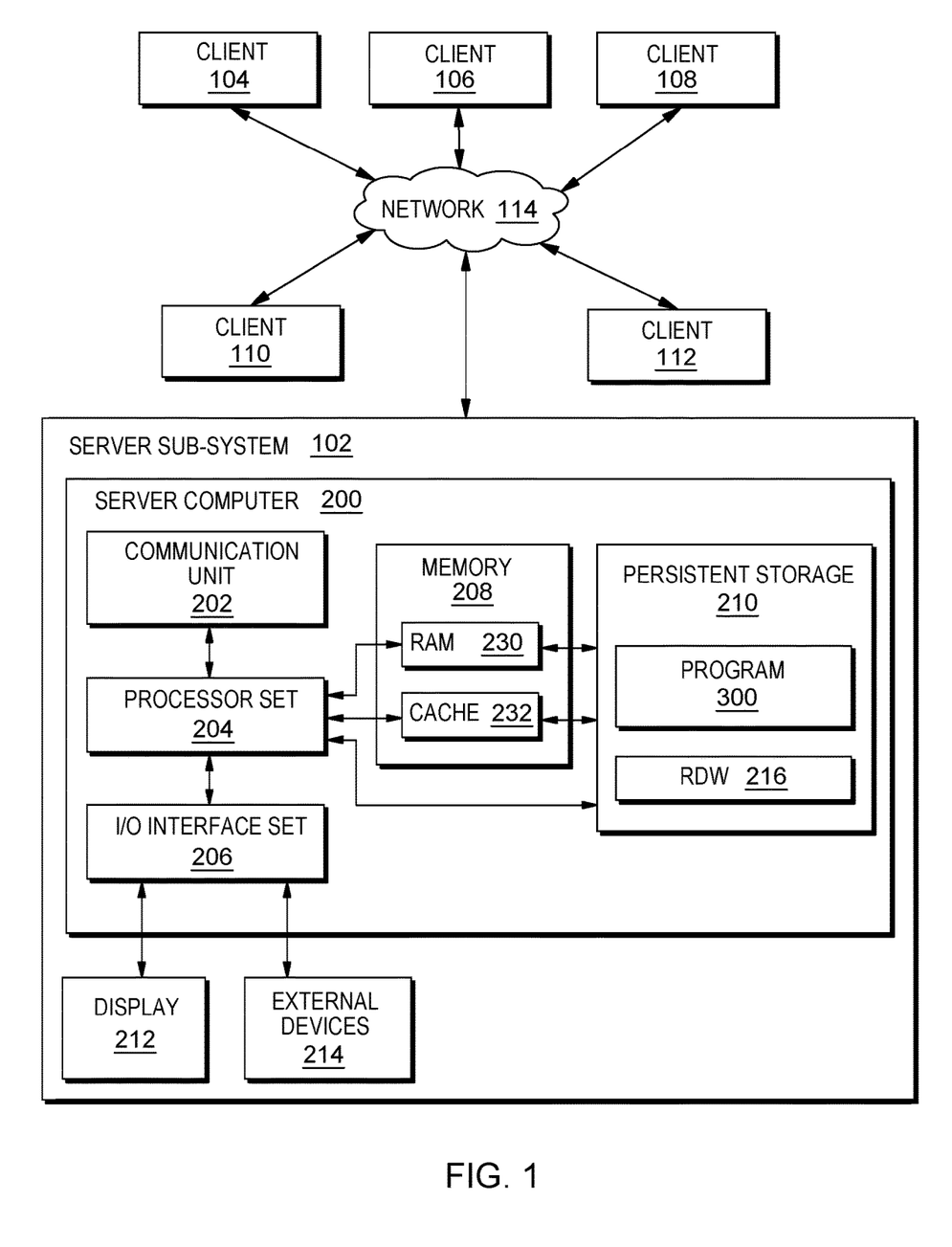
FIG. 1 is a block diagram view of a first embodiment of a system according to the present invention.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106, 108, 110, 112; and communication network 114. Server subsystem 102 includes: server computer 200; communication unit 202; processor set 204; input/output (I/O) interface set 206; memory 208; persistent storage 210; display 212; external device(s) 214; reference data warehouse (RDW) 216; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
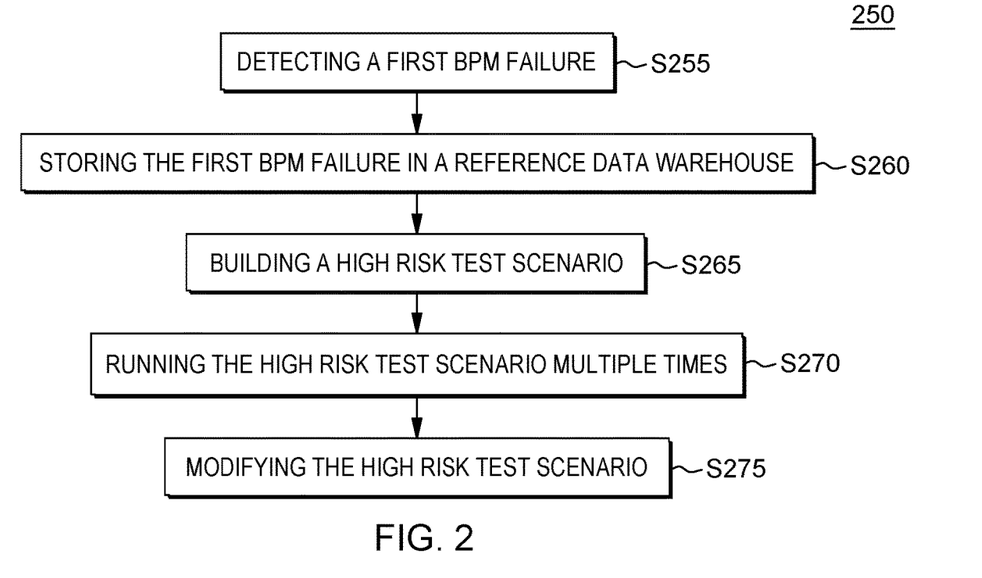
FIG. 2 is a flowchart showing a first embodiment method performed, at least in part, by the first embodiment system.
Figure 3:
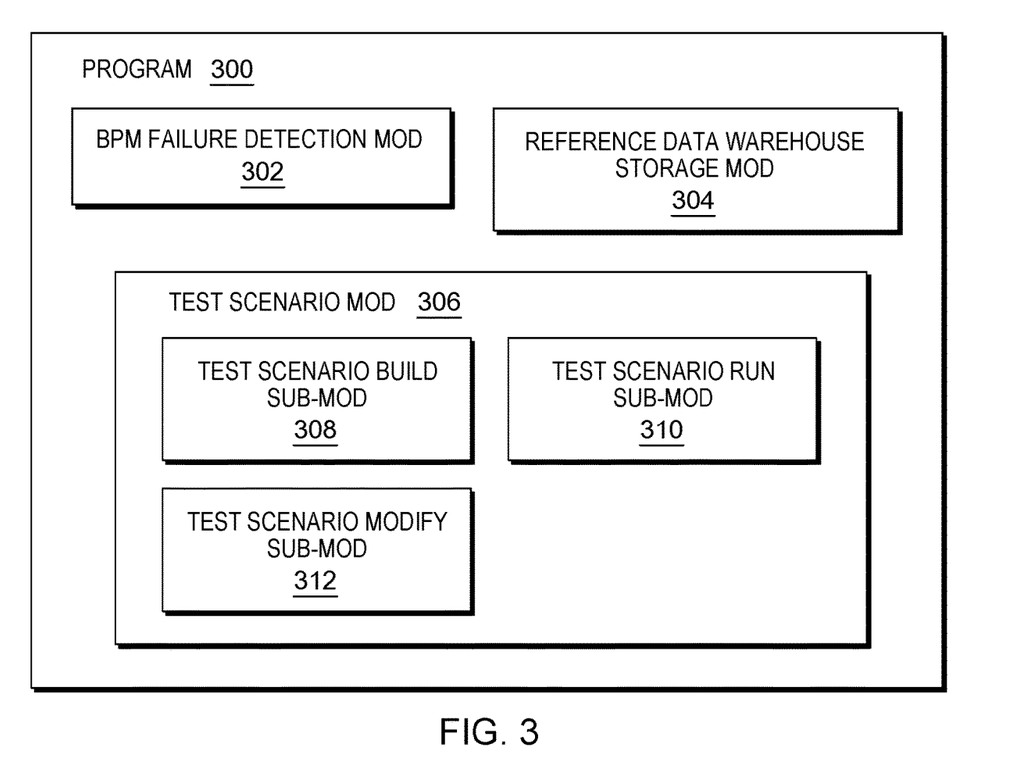
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or control performance of at least some of the method operations of flowchart 250. This method and associated software will now be discussed, over the course of the following paragraphs, with extensive reference to the blocks of FIGS. 1, 2 and 3.

Processing begins at operation S255, where BPM failure detection module ("mod") 302 detects a first BPM failure. In a given business process, there are many parameters that are used to define and consistently measure the success of that given business process. This operational function is illustrated by the following example. Assume, for example, that a given user is accessing a BPM system that is designed and configured to calculate mortgage rates for citizens of certain country. A bank employee using this BPM system will enter relevant identification information about a given person, such as name, age, salary, and job role. This type of identification information is one category of parameters (a human input) that is used to define and consistently measure the success of a given business process.

Continuing with this example, the business process may additionally require dynamic information from external systems (second category of parameters). For example, if a given user wants a mortgage for his or her house in foreign currency, a useful and relevant BPM system would be able to access and apply the currency rate for the day of calculation from a source that provides those currency rates (such as a national bank). Additionally, other dynamic information used by the given BPM system is be checking if the given user's salary is within the national average for his or her job role. In order to access this type of information, the business process will have to access data from some external system regarding the given user's job role.

The third category of parameters are internal (private) parameters to the business process. An example of an internal parameter is a credit score that is calculated by the business process by combining parameters from human input and dynamic parameters accessed from external systems.

In some embodiments of the present invention, BPM failure detection mod 302 detects at least one of the aforementioned parameters were either: (i) not properly utilized; (ii) not utilized; (iii) failed to be utilized because the parameter itself was not pertinent to the given business process; and/or (iv) failed to be utilized because the parameter was not recognized by the BPM process as a relevant parameter.

Processing proceeds to operation S260, where reference data warehouse storage mod 304 stores the first BPM failure in reference data warehouse (RDW) 216 (shown in FIG. 1). In some embodiments of the present invention, mod 304 stores multiple types of BPM failures, with the type of BPM failure being labeled in a manner that can train a machine learning program. In general, it is not possible to apply one general criteria for all BPM systems because the parameters and the parameter types will vary from one business process to another. For example, there can be a different set of parameters for system that is booking a user's airline ticket, and a second set of parameters for calculating the user's mortgage and/or insurance.

Alternatively, in some embodiments, there are instances where certain parameters can be globally applied for specific business processes (for example, for the "human input" category as referenced in connection with operation S255). In this case, the age limit parameter of users being between the ages of 18-70 can be globally applied for certain business processes. Additionally, it is difficult to globally apply parameters belonging to the second category of parameters (as referenced above in connection with operation S255).

Processing proceeds to operation S265, where test scenario build sub-module ("sub-mod") 308 of test scenario mod 306 builds a high risk test scenario. As used throughout this document, a high risk test scenario is a scenario that is automatically built based on the set of parameters that are recognized in a reference data warehouse (such as reference data warehouse 216) that is most likely causing a business process failure.

Processing proceeds to operation S270, where test scenario sub-mod 310 of mod 306 runs the high risk test scenario multiple times. Because the purpose of running the high risk test scenario is to discover: (i) which parameters in a given business process will fail, (ii) at what point in the business process the relevant parameters will fail, and (iii) how many times they will fail, it is important to gather a large set of data so that a machine learning program can be adequately trained to recognize which parameters to use in a given business process.

Processing proceeds to operation S275, where test scenario modify sub-mod 312 of mod 306 modifies the high risk test scenario. In some embodiments of the present invention, a high risk test scenario can be used for debugging a business process in an accelerated manner. The identified parameters from this test scenario can be modified so that commonly failing parameters can be identified and changed (if necessary). For example, consider the following information that is received after running multiple iterations of a business process in a 24-hour period:

Statistics from last 24 hours shows:
- Five (5) business processes failed—common parameter was age: 26
- 12 business processes failed—common parameter was currency: EUR
- 18 business processes failed—common parameter was location: Poland In this example, the high risk test scenario would include a business process with age set to 26, currency EUR and location to Poland.

Additionally, the common parameters that were identified in the above example are automatically determined to as "fixed" by a machine learning program. Continuing the discussion from the above example, the business processes that were run in the previous 24-hour period failed because the parameter currency was set to "EUR." In this example, it turns out that there was a problem with retrieving the currency rate. Here, developers manually fixed the issue. However, and more importantly, in the subsequent 24-hour period of running this high risk test scenario, the parameter of currency will not be part of any failing business processes and the machine learning program will slowly start to consider this parameter as "healthy."

III. Further Comments and/or Embodiments

Some embodiments of the present invention recognize the following facts, potential problems and/or potential areas for improvement with respect to the current state of the art: (i) business processes are a set of services that allows for the integration of multiple systems and solutions; (ii) it is usually launched with user specified parameters collected from a user interface (UI); (iii) typically depends on toolkits of multiple different versions that integrates different third party application program interfaces (APIs); (iv) due to complexity of such solutions, tracking problems with external tools is limited and difficult; (v) for example, business process management tools exist, however these tools are only able to track metrics and variables at the time of failure (where an integrated solution would be able to track private variables and stack trace that would be able to pinpoint related components even if they were not directly involved with an error—such as a value passed by a human or uncaught unsupported call to DB; and/or (vi) internally embedded monitoring and test solutions seems to be an ideal approach.

Some embodiments of the present invention may include one, or more, of the following operations, features, characteristics and/or advantages: (i) uses a self-learning mechanism that through constant monitoring and testing identifies a most frequently failing process instances in real time; (ii) collects critical data in a warehouse (such as a database—whether that database includes local or cloud-based storage) where that data is used by machine learning algorithms to learn and create "high risk" test scenarios list, which needs to be constantly tested and monitored; and/or (iii) stores critical data in the warehouse where that data is used by machine learning algorithms to learn and create "high risk" test scenarios list, which needs to be constantly tested and monitored.

A method according to an embodiment of the present invention includes the following operations (not necessarily in the following order): (i) collects information related to relevant parameters of a given business process; (ii) produces summary data of failed instances of a parameter (or parameters) of the given business process; (iii) storing the above information in a data warehouse (sometimes referred to herein as reference data warehouse 216); and/or (iv) uses a neural network to build a "high risk" scenario. Each of these operations will be discussed in further detail below.

With respect to the first operation, the following information is collected: (i) the relevant parameters used by the given business process at the time of failure; (ii) the toolkit in which the service is located; and (iii) related underlying parameters in a stack trace that are not directly related to the failure of the given business process.

With respect to the second operation, summary data is produced on the following failed instances: (i) most problematic toolkits; (ii) user defined parameters involved in a service failure; (iii) REST API common parameters; and/or (iv) codes that are usually involved in errors. With respect to the third operation, the summary data produced is stored in a specialized database (such as reference data warehouse 216) so that such data can be used to develop and modify a "high risk" test scenario in order to determine the point at which certain parameters fail in the given business process.

With respect to the fourth operation, embodiments of the present invention use a neural network to build a "high risk" test scenario. This "high risk" test scenario is typically automatically launched at the time intervals that are configured by an administrator of this solution. The "high risk" test scenario will be constantly tested (that is, this test will be run a sufficient number of times that a machine learning algorithm can properly learn how to identify failed or failing parameters), including after a development team has fixed the errors in the service.

In some embodiments, tests will continue to be run multiple times for some period of time after the point of failure is fixed due to the fast changing third party solution. As a result, it may need more test coverage even if the service is temporary healthy. Additionally, based on the information collected from the second operation, the method provides for the ability to run dry run tests that take in account usual and unusual REST API Responses to help ensure the integrity of the system and proper error handling.

In some embodiments of the present invention, there are self-modifying "high risk" test scenarios that constantly run and monitor the most problematic services, APIs, and toolkits. In this type of self-modifying test scenarios, new parameters are added when failure is found, fixed parameters are removed from the scenario after the service is determined to be properly functioning.

Some embodiments of the present invention may include one, or more, of the following operations, features, characteristics and/or advantages: (i) provides for real-time testing of a business process management system; (ii) provides for real-time monitoring of a business process management system; (iii) runs various business processes by a set of user(s); (iv) during sequential execution of defined business processes steps, the business process management (BPM) solution collects all internal runtime and external parameters (for example, from network device(s), database(s), APIs, etc.); (v) upon any detected process failure, all parameters of this process are stored in the reference data warehouse; (vi) machine learning/artificial intelligence (ML/AI) modules continually build "high risk" test scenarios using commonly failing parameters obtained from a reference data warehouse (such as reference data warehouse 216 shown in FIG. 1); and/or (vii) "high risk" test scenarios are continually run to identify the problematic parameters (that is, the parameters that consistently fail in multiple rounds of testing or parameters that are deemed likely to fail after multiple rounds of testing).

Some embodiments of the present invention may include one, or more, of the following operations, features, characteristics and/or advantages: (i) notifies a support team about the problematic parameters that fail after multiple rounds of testing; (ii) the support team fixes the problematic parameters; (iii) after the problematic parameters are fixed, the "high risk" test scenarios are modified and healthy parameters are eventually phased out from the test scenario; and/or (iv) optional offline simulation of similar business process steps are performed using historical data from a reference data warehouse (such as reference data warehouse 216) to mitigate the risk of running these operations in real environment (such as a high volume production environment).

Some embodiments of the present invention may include one, or more, of the following operations, features, characteristics and/or advantages: (i) uses machine learning to dynamically generate the most accurate single test case with failing parameters at any point of time; and/or (ii) identifies runtime parameters of the failing steps of business process and monitor them until fix is applied.

Figure 4:
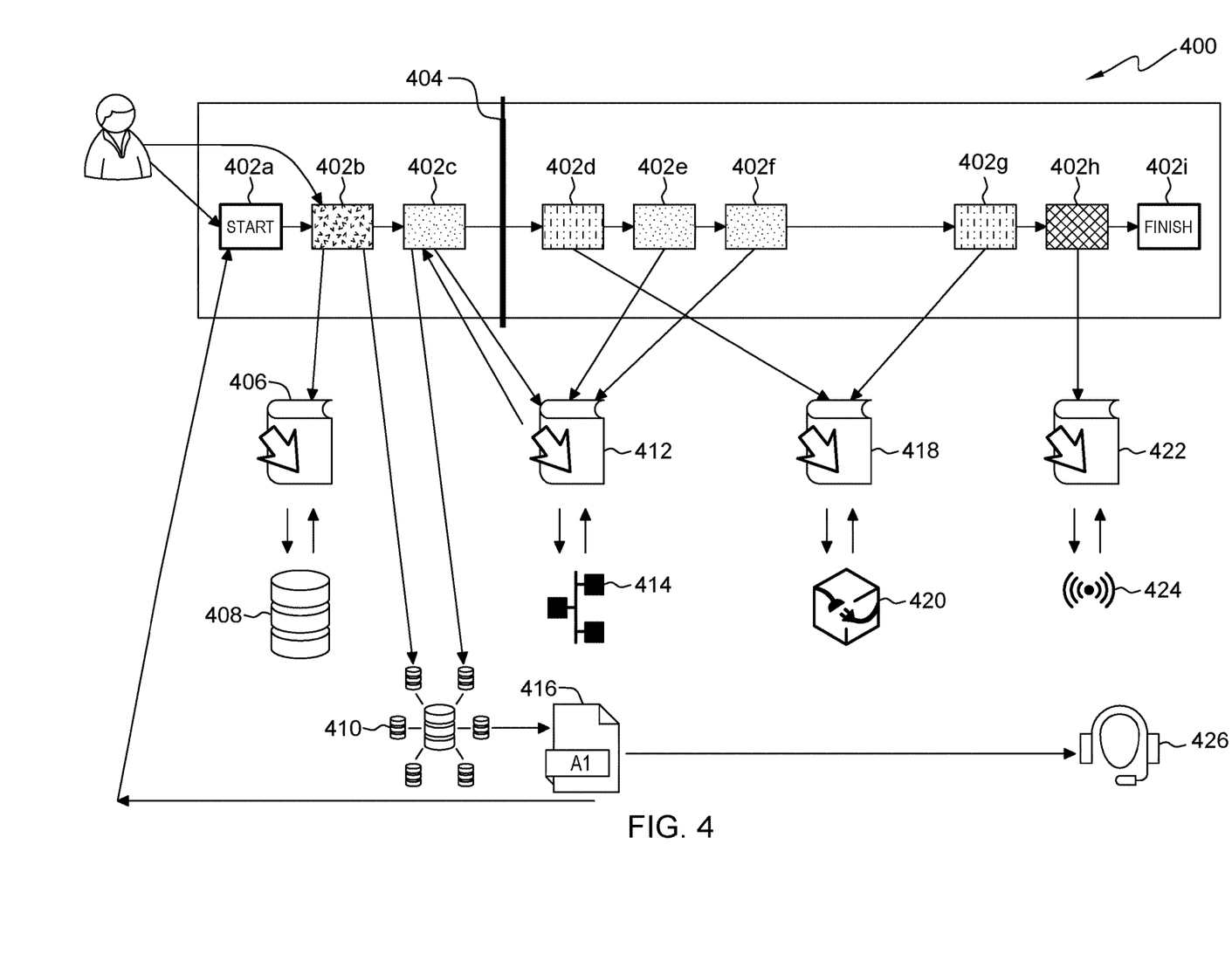
FIG. 4 is a block diagram showing a series of interconnected blocks and processes used and generated by the first embodiment system.

FIG. 4 is a visual representation of block diagram 400 showing a series of inter-connected blocks and processes used and generated by an embodiment of the present invention. Block diagram 400 includes: user defined parameters 402a-402i; point of failure marker 404; toolkit 406; database 408; data warehouse 410; toolkit 412; network device 414; artificial intelligence module 416; toolkit 418; third-party application program interface (API) 420; toolkit 422; sensor 424; and user 426.

In some embodiments of the present invention, as shown in block diagram 400, user defined parameters 402a-402i are used to run multiple rounds of testing to determine at least the following information: (i) point of failure marker 404; (ii) how many and what parameters of parameters 402a-402i did or did not fail in a given run of testing; and/or (iii) which of the failed parameters of parameters 402a-402i can be used by artificial intelligence module 416 (taken from data warehouse 410, which is similar to, but not necessarily the same as reference data warehouse 216) to improve future detection of business process failures.

In some embodiments of the present invention, artificial intelligence module 416 performs the following operations and/or functions: (i) identifies bottlenecks in the business process(es); (ii) identifies problematic toolkits (for example, toolkits that do not or cannot properly integrate databases, network devices, third party APIs, etc.); (iii) identifies problematic parameters that cause the business process to fail; and/or (iv) learns how to build high risk test scenarios that can handle large volumes of data (including historic data and newly-trained data pertaining to recently failed or failing parameters).

In some embodiments of the present invention, as shown in block diagram 400, the following instances of toolkit integrations occur: (i) toolkit 406 integrates database 408; (ii) toolkit 412 integrates network device 414; (iii) toolkit 418 integrates third-party API 420; and (iv) toolkit 422 integrates sensor 424. Typically, in a BPM, toolkits are sets of computer code that are responsible for performing the above integrations.

Some real-world examples of integrations that are performed by BPMs include: (i) integrating a given system with the computer system of a National Bank when calculating the interest rate and loan term for a mortgage; (ii) integrating an insurance company's system with the computer system of a weather company to calculate the risk of an adverse weather event (such as a tornado) in certain areas and to properly calculate the insurance rates to charge customers based on the calculated risk. These examples are illustrative in nature only, and are not meant to limit the types of integrations that can be used by BPMs.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

What is claimed is:

1. A computer-implemented method (CIM) comprising:
running, by a first user, a first plurality of runs of a first set of business processes, with each run of the first plurality of runs including collecting a set of internal runtime parameters and external parameters;
detecting, by a business process failure detection module, a first business process management (BPM) failure, with the detection of the first BPM failure including detecting internal runtime and external parameters involved in the run associated with the first BPM failure, and with the first BPM failure being labeled in a manner that can be used to train a BPM machine-learning module to build high risk test scenarios;
storing, in a reference data warehouse, the internal runtime and external parameters involved in the run associated with the first BPM failure;
building, by the BPM machine-learning module, a first high risk test scenario, with the building of the first high risk test scenario including:
collecting, by the BPM machine-learning module, a set of BPM failure training data,
receiving, from a reference data warehouse, a set of parameters that the BPM machine-learning module uses for running the first plurality of runs, and
responsive to the receipt of the set of parameters, identifying a sub-set of parameters as commonly causing the first plurality of runs to fail;
training the BPM machine-learning module with the first labeled BPM failure parameters to recognize which set of parameters to use;
running, by the BPM machine-learning module, a second plurality of runs of the first high risk test scenario;
updating the collected set of BPM training data to include the sub-set of parameters identified as commonly causing the first plurality of runs to fail; and
responsive to the running of the second plurality of runs, modifying, by the BPM machine-learning module, the first high risk test scenario by:
identifying a sub-set of problematic parameters, and removing the sub-set of problematic parameters.

2. The CIM of claim 1 wherein the modification of the first high risk test scenario further includes:
fixing the sub-set of problematic parameters.

3. The CIM of claim 1 wherein the removed sub-set of problematic parameters are phased out from being included in future high risk test scenarios.

4. The CIM of claim 1 wherein a business process solution module collects the internal runtime and external parameters from a first network device.

5. The CIM of claim 1 wherein the business process solution module collects the internal runtime and external parameters from a first database.

6. The CIM of claim 1 wherein the business process solution module collects the internal runtime and external parameters from a first application program interface (API).

7. A computer program product (CPP) comprising:
a machine-readable storage device; and
computer code stored on the machine-readable storage device, with the computer code including instructions and data to cause a processor(s) set to perform operations including the following:
running, by a first user, a first plurality of runs of a first set of business processes, with each run of the first plurality of runs including collecting a set of internal runtime parameters and external parameters,
detecting, by a business process failure detection module, a first business process management (BPM) failure, with the detection of the first BPM failure including detecting internal runtime and external parameters involved in the run associated with the first BPM failure, and with the first BPM failure being labeled in a manner that can be used to train a BPM machine-learning module to build high risk test scenarios,
storing, in a reference data warehouse, the internal runtime and external parameters involved in the run associated with the first BPM failure,
building, by the BPM machine-learning module, a first high risk test scenario, with the building of the first high risk test scenario including:
collecting, by the BPM machine-learning module, a set of BPM failure training data,
receiving, from a reference data warehouse, a set of parameters that the BPM machine-learning module uses for running the first plurality of runs, and
responsive to the receipt of the set of parameters, identifying a sub-set of parameters as commonly causing the first plurality of runs to fail,
training the BPM machine-learning module with the first labeled BPM failure parameters to recognize which set of parameters to use,
running, by the BPM machine-learning module, a second plurality of runs of the first high risk test scenario,
updating the collected set of BPM training data to include the sub-set of parameters identified as commonly causing the first plurality of runs to fail, and
responsive to the running of the second plurality of runs, modifying, by the BPM machine-learning module, the first high risk test scenario by:
identifying a sub-set of problematic parameters, and removing the sub-set of problematic parameters.

8. The CPP of claim 7 wherein the modification of the first high risk test scenario further includes:
fixing the sub-set of problematic parameters.

9. The CPP of claim 7 wherein the removed sub-set of problematic parameters are phased out from being included in future high risk test scenarios.

10. The CPP of claim 7 wherein the business process solution module collects the internal runtime and external parameters from a first network device.

11. The CPP of claim 7 wherein the business process solution module collects the internal runtime and external parameters from a first database.

12. The CPP of claim 7 wherein the business process solution module collects the internal runtime and external parameters from a first application program interface (API).

13. A computer system (CS) comprising:
a processor(s) set;
a machine-readable storage device; and
computer code stored on the machine-readable storage device, with the computer code including instructions and data for causing the processor(s) set to perform operations including the following:
running, by a first user, a first plurality of runs of a first set of business processes, with each run of the first plurality of runs including collecting a set of internal runtime parameters and external parameters,
detecting, by a business process failure detection module, a first business process management (BPM) failure, with the detection of the first BPM failure including detecting internal runtime and external parameters involved in the run associated with the first BPM failure, and with the first BPM failure being labeled in a manner that can be used to train a BPM machine-learning module to build high risk test scenarios,
storing, in a reference data warehouse, the internal runtime and external parameters involved in the run associated with the first BPM failure,
building, by the BPM machine-learning module, a first high risk test scenario, with the building of the first high risk test scenario including:
collecting, by the BPM machine-learning module, a set of BPM failure training data,
receiving, from a reference data warehouse, a set of parameters that the BPM machine-learning module uses for running the first plurality of runs, and responsive to the receipt of the set of parameters, identifying a sub-set of parameters as commonly causing the first plurality of runs to fail,
training the BPM machine-learning module with the first labeled BPM failure parameters to recognize which set of parameters to use,
running, by the BPM machine-learning module, a second plurality of runs of the first high risk test scenario,
updating the collected set of BPM training data to include the sub-set of parameters identified as commonly causing the first plurality of runs to fail, and
responsive to the running of the second plurality of runs, modifying, by the BPM machine-learning module, the first high risk test scenario by:
identifying a sub-set of problematic parameters, and
removing the sub-set of problematic parameters.

14. The CS of claim 13 wherein the modification of the first high risk test scenario further includes:
fixing the sub-set of problematic parameters.

15. The CS of claim 13 wherein the removed sub-set of problematic parameters are phased out from being included in future high risk test scenarios.

16. The CS of claim 13 wherein the business process solution module collects the internal runtime and external parameters from a first network device.

17. The CS of claim 13 wherein the business process solution module collects the internal runtime and external parameters from a first database.

18. The CS of claim 13 wherein the business process solution module collects the internal runtime and external parameters from a first application program interface (API).

* * * * *